Oct. 8, 1929.  H. J. BUCHANAN-WOLLASTON  1,730,404
FLUID METER
Filed March 6, 1926  2 Sheets-Sheet 1
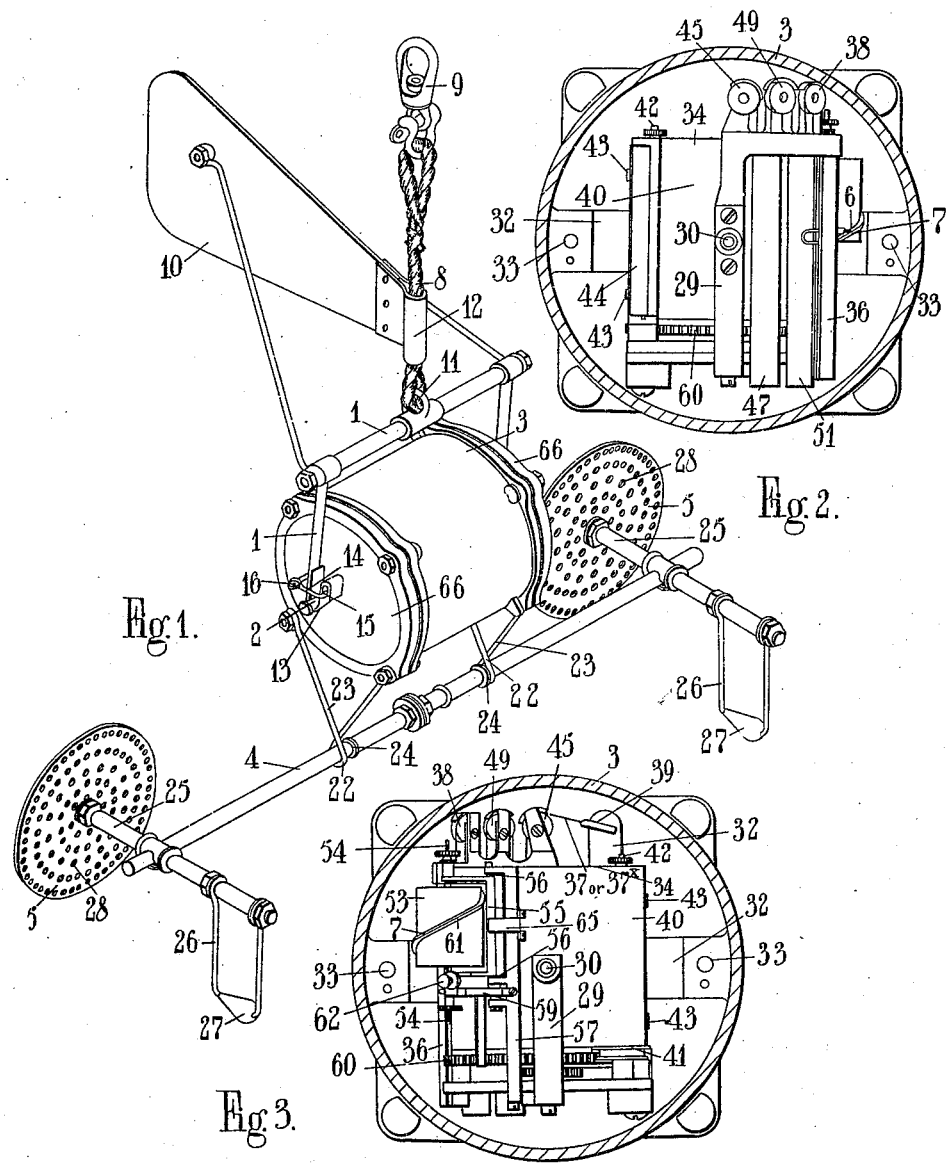

Oct. 8, 1929.     H. J. BUCHANAN-WOLLASTON     1,730,404
FLUID METER
Filed March 6, 1926     2 Sheets-Sheet 2

H. J. B. Wollaston
INVENTOR
By Marks & Clerk
ATTYS.

Patented Oct. 8, 1929

1,730,404

UNITED STATES PATENT OFFICE

HUGO JOHN BUCHANAN-WOLLASTON, OF LOWESTOFT, ENGLAND

FLUID METER

Application filed March 6, 1926, Serial No. 92,861, and in Great Britain March 16, 1925.

This invention relates to a meter (hereinafter referred to as a current meter) for measuring the speed and the direction of flow of a current of fluid or for measuring the speed and the direction of movement of a body moving through a fluid. The current meter is more particularly intended for use at sea as a tidal flow meter, but may be adapted for use as an anemometer, as a ship's log or for analogous purposes.

Broadly, the invention comprises a current meter, which measures the speed of flow of a current of fluid, by measuring the angle through which casing or other carrier rotates relatively to a measuring or recording instrument pendulously carried thereon, said casing or carrier being adapted to be turned in a vertical plane by the action of a current of fluid.

The said casing or carrier is mounted on bearings which are carried on a supporting sling, the sling being mounted on a swivel which is made fast to a rope or the like which is made fast to the ship or fixed object from which it is desired to use the meter. The said bearings are horizontal, so that the said casing is rotatable on them in a vertical plane. The said casing or carrier has, attached to it, one or more bodies, the said bodies and casing being so weighted that the centre of gravity of casing and attached bodies together lies below the axis about which the casing is rotatable, and thus the casing is in stable equilibrium on its bearings. The said bodies are more expanded or offer more surface below the said axis than above it. The said casing and attached bodies are immersed in the fluid the speed of flow of which it is desired to measure with the meter. When the said fluid is in horizontal motion its impact on the said bodies will cause the casing to rotate on its bearings until the moment of the force exerted by the fluid about the axis about which the casing is rotatable is equal to the moment of the weight of the casing and attached bodies about the same axis. The casing will thus rotate through a definite angle for a definite speed of flow of the fluid, and will then maintain the same angular position while this speed of flow is maintained. The angular position taken up by the casing for various speeds of flow of the fluid is, according to the present invention, recorded on a record sheet borne on a clockwork drum mounted on a frame which is mounted pendulously in or on the said casing. The said frame is mounted on bearings which are either in a line with or parallel to the bearings of the aforesaid casing. The said frame is weighted so that its centre of gravity is below the axis about which the frame is rotatable. Thus, when the aforesaid casing rotates on its bearings, the frame carrying the clockwork drum maintains its position relatively to the vertical. The axes about which the aforesaid carrier and frame rotate are maintained at right angles to the direction of flow of the current by means of a vane fixed to the sling which carries the rotatable casing. The angle through which the casing is turned by the action of a given current of fluid is recorded on the said clockwork drum by means of a pen or other marking point which is moved through any transmission system suitable for transmitting a motion to the pen corresponding to the relative angle between the position of the frame carrying the clockwork drum and the position of the rotary casing. I prefer to use the following transmission system. To a rigid projection attached to the casing or carrier is attached a flexible cord. This cord is led over a pulley attached to a rigid part of the frame carrying the clockwork drum and its end is attached to a weight sliding up and down in a vertical guide-tube, which tube has a vertical slit in it through which projects a wire or the like fixed to the said weight. To the wire is attached a marking point. Thus, when the rotary casing rotates relatively to the recording instrument, the said cord will be pulled or slackened, the weight will slide up or down in its guide-tube, and the marking point will make a mark on the record sheet on the drum, the height of the mark on the drum corresponding to a given speed of current. For use in waters in which there is considerable wave motion, the transmission system is modified by the insertion of a dashpot device to eliminate rapid oscillation of the marking point. The dashpot device used in the present invention is described in detail hereinafter, as embodied in a meter constructed specially for use at sea.

According to another feature of the invention, the recording instrument of the current meter is furnished with a two point compass, on which is mounted a spiral inker, adapted to be pressed at given intervals of time against a record sheet on a revolving record drum, making an ink mark thereon, its position corresponding to the orientation of the said casing or carrier relatively to the earth's magnetic field, the compass being free to set itself anew to the earth's field between the times at which the said ink marks are being made.

Other features of the invention are also hereinafter described with reference to this embodiment of the invention suitable for work at sea.

This invention is illustrated in the accompanying drawings, in which:—

Fig. 1 is a perspective view of one form of current meter;

Fig. 2 is a vertical transverse section through the casing looking from the left in Fig. 1, showing the recording instrument in elevation;

Fig. 3 is a vertical transverse section through the casing looking from the right in Fig. 1, showing the recording instrument in elevation;

Figure 4:
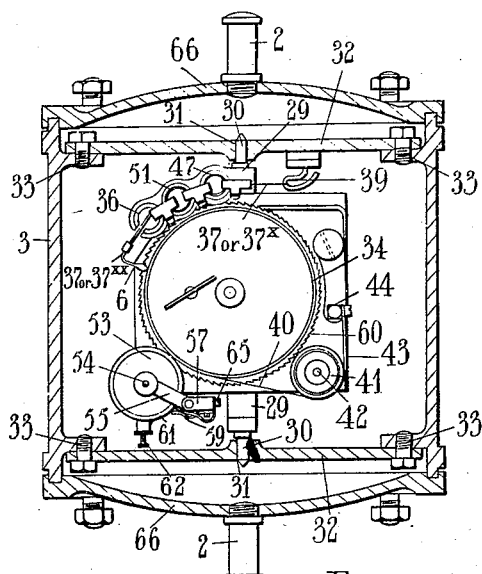
Fig. 4 is a horizontal transverse section through the casing, showing the recording instrument in plan.
Figure 5:
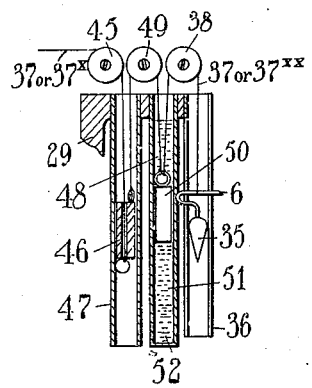
Fig. 5 is a sectional elevation of a detail of the recording instrument for indicating speed.
Figure 6:
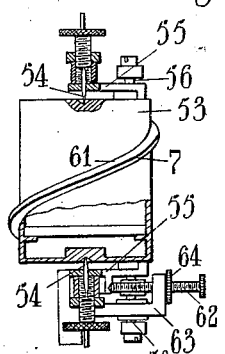
Fig. 6 is an elevation partly in section of a detail of the recording instrument for recording direction.

The form of construction of recording meter shown comprises a frame 1 adapted to be suspended from a suitable support with facility of being turned in azimuth by the current to be measured, horizontal trunnions 2 mounted transversely on the supporting frame so as to be normal to the direction of the current, a water-tight casing 3 turnably mounted about the horizontal axis of the trunnions, a rod 4 rotatably carried beneath the casing parallel to the axis of the casing, perforated discs 5 mounted on the rotary rod so as to be maintained vertical and parallel to the rotary rod and so as to rotate the casing about its horizontal axis, a recording instrument 6—7 pendulously carried on the axis of the casing for recording the angular rotation of the casing about its axis which gives a measure of the force of the current and for recording the angular movement of the axis of the casing in azimuth which gives the compass direction of the current.

In Fig. 1 the frame 1 which carries the trunnions 2 on which the casing 3 is mounted is suspended in the sea (as shown in Fig. 1) by means of a line 8 and a swivel 9 or the like from a buoy or a ship (not shown) so as to be free to turn about the vertical axis of the swivel in a horizontal plane. The frame carries a vertical vane 10 which sets the meter to the current. The line is attached to the frame at 11 and passes through a tube 12 on the vane. The casing 3 is supported with its trunnions 2 resting in bearings 13. The trunnions are detachably secured in the bearings by means of staples 14 hinged at 15 to the frame 1 and adapted to be locked over the trunnions by removable bolts 16 passing through the free ends of the staples.

Figure 8:
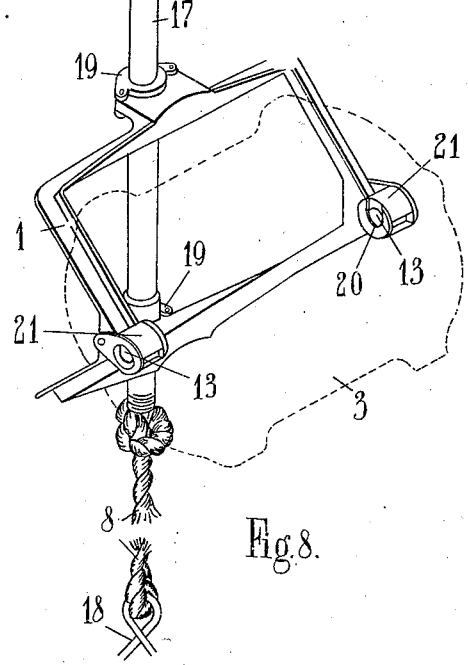
Fig. 8 is a perspective view of a modification.

In Fig. 8, the frame which carries the trunnions 2 is suspended by means of a vertical tube 17 which may be supported by a line 8 or in a rigid manner. The casing is supported with its trunnions 2 in bearings 13 which are offset in relation to the vertical tube 17. The tube 17 must be weighted by the attachment of a sinker at 18 in order that the force of a current may have a greater effect in swinging the tube 17 and the sinker at 18 from the vertical. Thus the frame and drum will swing round the tube 17 until it is directly on the "down stream" side of the tube 17. No vane is necessary in this case. The frame 1 may be detachably connected to the vertical tube by hinged bearing clamps 19 turnably mounted on the tube 17, and the trunnions may be detachably mounted in the bearings by means of longitudinally slotted sleeves 20 which can be turned in longitudinally slotted bosses 21 so that the slots register when the trunnions can be removed, or so that the slots are out of register when the trunnions are locked in situ.

In the construction shown in Fig. 1 the frame may be weighted by weights depending clear of the end of the casing from lines attached to the horizontal member of the frame.

The horizontal rod 4 carrying the vertical perforated discs 5 is mounted in the eyes 22 of wire slings or brackets 23 depending from and rigidly attached to the casing 3, the rod being free to turn in the slings or the brackets but being prevented from endwise movement therein by stops 24. The perforated discs are carried on the free ends of radial arms 25 projecting at each end of and fast to the rotary rod, and the radial arms are extended diametrically to receive loops 26 to carry counterbalances 27 for the perforated plates. The counterbalances are streamlined and arranged with their longitudinal axes normal to the discs, and are suspended or slung at a lower level than the discs. The whole arrangement thus has a vertical plane of symmetry in the direction of flow of the current. The perforated discs are maintained vertical by the counterbalances, and are maintained normal to a horizontally flowing current by the vane on the frame.

The force of the current impinging on the perforated discs turns the casing on its trunnions until its moment about the axis of the casing is balanced by the moment of the weight of the discs, the counterbalances and the parts supporting them from the casing about the same axis. The discs are perforated symmetrically with large holes 28 for the purpose of avoiding or reducing streamline effects or eddies and thereby obtaining a near approximation to the law connecting the force due to a fluid current on a plate with the speed of the current. The various angles through which the casing turns on its trunnions, therefore, correspond to different currents, and these angles are recorded by the recording instrument which is mounted within the casing.

The recording instrument is mounted on a pendulous sling or cradle 29 which depends from axis of and within the casing, being supported by trunnions 30 in bearings 31 in cross-bars or bridges 32 detachably connected at 33 to the casing. The recording instrument comprises a clockwork driven record drum 34, which has its axis of revolution on and maintained vertical by the pendulous cradle, so that when the casing is turned by the action of the current on the perforated discs, the axis of revolution of the recording drum remains vertical.

The recording pen 6 for recording the speed or force of the current is mounted on a weight 35, which slides in a vertical guide or split tube 36 parallel to the axis of the record drum. The weight is attached to one end of a line 37, which passes over a guide pulley or pulleys 38 and has its other end attached to an anchor point 39 inside the casing on one of the bridges 32. The recording pen consists of an inked sable brush or the like, which traces a graph on a record sheet or paper 40 carried by the record drum. The record sheet is fastened at one end by adhesive or otherwise to the drum, and is fed off a reel 41 rotatably mounted on a spindle 42 on the cradle and braked by springs 43 supported by a post 44 on the cradle. The arrangement is such that as the casing is turned by the action of the current on the perforated discs, the recording pen is moved from a datum line up the record sheet on the clockwork driven drum and traces a graph of the speed or force of the current.

The dashpot or damping arrangement for eliminating small movements of the recording pen owing to wave motion or the like is interposed in the line or flexible connection 37 between its anchorage 39 to the casing and its attachment to the recording pen 6. In this arrangement, a line 37 from the anchorage on the casing passes over a pulley 45 down to a weight 46 slidable in a vertical tube or guide 47; a second line 48 passes from the weight 46 up over a second pulley 49 and down to a second weight or sinker 50 in an intermediate vertical tube 51 which is charged with toilet paraffin oil or the like 52; and a third line 37 passes from the sinker 50 up over a third pulley 38 and down to a third weight 35 in a third vertical tube 36, and this third weight 35 carries the recording pen 6. The weights in the three guides or tubes should be such that the first and the third weights are greater than the intermediate weight, and the second weight is greater than the third weight. When the first weight is lifted by the turning of the casing about its horizontal axis, the second weight slowly sinks in its oil tube and draws up the pen weight until the lines joining the weights become taut. It will be seen, therefore, that the pen weight follows the movements of the first weight, but with the lag depending upon the viscosity of the oil in the oil tube. Special arrangements may be provided for reducing friction between the weights and the guides or tubes, for example, the weights may be formed or provided with anti-friction wheels or rollers or other means adapted to make rolling contact with the guides or tubes.

The recording helix 7 for recording the direction of the current is mounted around a cylindrical two-point compass 53, which is free to rotate about an axis of revolution on and maintained vertical by the pendulous cradle. The axis of revolution of the compass is formed by needles 54 carried by a bracket 55 which is pivotally mounted at 56 so as to be free to be turned in a horizontal plane on a standard 57 on the pendulous cradle, so as to bring the recording helix in contact with or out of contact with the record sheet on the record drum. The two-point compass when out of contact with the record sheet on the record drum, is free to set itself to the earth's magnetic field. The bracket 55 carrying the compass is provided with a pawl 58, which is pivoted coaxially with the bracket 55, and engages, under the action of a spring 59, a ratchet toothed wheel 60 at the base of and coaxial with the clockwork driven record drum. The arrangement is such that each time the pawl rides up the inclined face of a tooth, the compass is free to set itself to the earth's magnetic field, and each time the pawl drops into a space between two teeth, the helical marker is pressed against the record sheet on the record drum and makes an ink mark thereon. The position of the ink mark on the record drum, measured parallel to the axis of the drum, gives the compass point to which the meter is set by the current acting on the vane.

The helical marker may consist of an india-rubber strip or tube 61 carrying a length of absorbent line 7 which has been inked.

Figure 7:
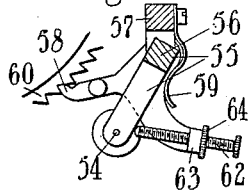
Fig. 7 is a horizontal section on the plane 7—7 in Fig. 6.

A set screw 62 may be used for serving as an adjustable stop for determining the inward position of the helical marker. The set screw is mounted in a lug 63 on the pawl 58 and is locked by a nut 64. The set screw bears against the bracket 55 to press the recording helix against the record sheet when the pawl is in the position shown in Fig. 7, and the bracket is normally held so that the helix is just out of contact with the recording sheet by a spring 65 which bears against a flat face of the bracket.

The discs 5 may be dismountable to enable larger and lighter or smaller and heavier discs or the like to be substituted therefor, when it is desired to record very small currents or very large currents.

The ends 66 of the casing are dismountable to permit access to its interior.

It will be seen that the meter, according to the present invention, records on the same record paper one graph representing the force or speed of the current, and another graph or intermittent graph representing the compass direction of the current.

It will be noted also that the record of speed is continuous, and subtle phenomena in the current are therefore indicated.

The meter is of advantage, inter alia, in that it records both speed and direction by means of ink pens, pencils or the like, and utilizes purely mechanical principles in obtaining the recording action. Further, the accuracy of the meter is not materially affected by wear in the bearings.

The clock-drum may be removed and replaced by another going at a quicker rate, to enable the observation and recording of rapid changes of current.

Although the apparatus has been particularly described with reference to a sea current meter, it may be used or adapted, as aforesaid, as a recording anemometer, or a recording ship's log, or indeed for many other purposes where it is necessary to record changes of speed and direction of flow of a fluid or of movement through a fluid associated with a time record.

Various modifications of the apparatus described may be made without departing from the nature of the invention.

Having now described my invention what I claim as new, and desire to secure by Letters Patent is:—

1. A meter for recording the speed of a fluid, comprising a sling turnably mounted on a support and having bearings in a horizontal line, a carrier mounted on said bearings and rotatable on them, bodies attached to said carrier, bodies and carrier weighted to bring their combined center of gravity below the axis about which the carrier is rotatable, the bodies being constructed to offer greater resistance to passage of a horizontally flowing fluid past them below the said axis than above it, a recording instrument, comprising a clockwork drum bearing a record sheet, mounted on bearings on said carrier and in a line with the bearings on which the carrier is mounted on the sling, said recording instrument being weighted so as not to change its angular position relatively to the horizon during rotation of the carrier on its bearings, and a transmission system to record on the recording instrument a mark corresponding in position relatively to the bottom of the clockwork drum with the relative angle of rotation between the carrier and said recording instrument caused by the force of a current of fluid.

2. A meter for recording the speed of a fluid, as claimed in claim 1, and in which the said transmission system consists of a cord having one end anchored to the carrier, a weight attached to the other end of the cord, the weight slidable in a vertical guide-tube, the guide-tube having a vertical slit through which a projection from the weight passes, the projection being fitted with a recording point.

3. A meter for recording the speed of a fluid, as claimed in claim 1, and in which the transmission system consists of a cord having one end anchored to the carrier, a weight slidable in a vertical guide-tube and attached to the cord, a second weight slidable in a second guide-tube containing oil, a cord connecting first and second weight and passing over a pulley, a third weight slidable in a vertical guide-tube which has a vertical slit, the third weight having an attachment which projects through said vertical slit and carries a recording point, and a cord connecting second and third weight.

4. A fluid meter comprising a supporting casing and a recording device mounted therein and rotatable relative thereto under the influence of the fluid, the device comprising a recording drum, a guide tube, a weighted member slidable in the tube, a scribing instrument attached to the member, and a cord having one end attached to the casing and adapted to raise or lower the member in accordance with the relative movement between the casing and the recording device.

5. A fluid meter comprising a casing rotatably mounted and adapted to be rotated by the fluid, and a recording device coaxially and rotatably mounted therein and comprising a recording drum, a guide tube in close proximity to the drum, a weighted member slidable in the tube and carrying a scribing instrument, and a cord one end of which is attached to the casing the other end being operatively connected to the weighted member.

6. A fluid meter comprising a casing freely rotatable about an axis and having surfaces asymmetrical with respect to the axis and on which the fluid is to impinge, a recording device rotatably and coaxially mounted within the casing and comprising a recording drum, a guide tube having a slot in close proximity thereto, a weighted member slidable in the tube, a scribing instrument on the member and movable in the slot, and a cord having one end attached to the casing and adapted to raise or lower the member in accordance with the relative movement between the casing and the recording device, additional recording means being provided adapted to indicate the direction of flow of said fluid.

In witness whereof I affix my signature.

HUGO JOHN BUCHANAN WOLLASTON.